(No Model.)  2 Sheets—Sheet 1.

E. A. UEHLING.
GAS SEAL FOR BLAST FURNACES.

No. 273,194.  Patented Feb. 27, 1883.

WITNESSES:
Dorn Twitchell
C. Sedgwick

INVENTOR:
E. A. Uehling
BY Munn & Co
ATTORNEYS.

(No Model.) 2 Sheets—Sheet 2.

E. A. UEHLING.
GAS SEAL FOR BLAST FURNACES.

No. 273,194. Patented Feb. 27, 1883.

WITNESSES:
Donn Twitchell
C. Sedgwick

INVENTOR:
E. A. Uehling
BY Munn & Co
ATTORNEYS.

UNITED STATES PATENT OFFICE.

EDWARD A. UEHLING, OF SHARPSVILLE, PENNSYLVANIA.

GAS-SEAL FOR BLAST-FURNACES.

SPECIFICATION forming part of Letters Patent No. 273,194, dated February 27, 1883.

Application filed July 3, 1882. (No model.)

*To all whom it may concern:*

Be it known that I, EDWARD A. UEHLING, of Sharpsville, in the county of Mercer and State of Pennsylvania, have invented a new and useful Improvement in Gas-Seals for Blast-Furnaces, of which the following is a full, clear, and exact description.

The object of my invention is to provide for the automatic opening and closing of gas-seals in the charging of furnaces.

To this end my invention consists in the arrangement, in connection with the seal, of cylinders and a system of levers fitted for operating by steam or compressed air, as hereinafter described and claimed.

Reference is to be had to the accompanying drawings, forming part of this specification, in which similar letters of reference indicate corresponding parts in both the figures.

Figure 1:
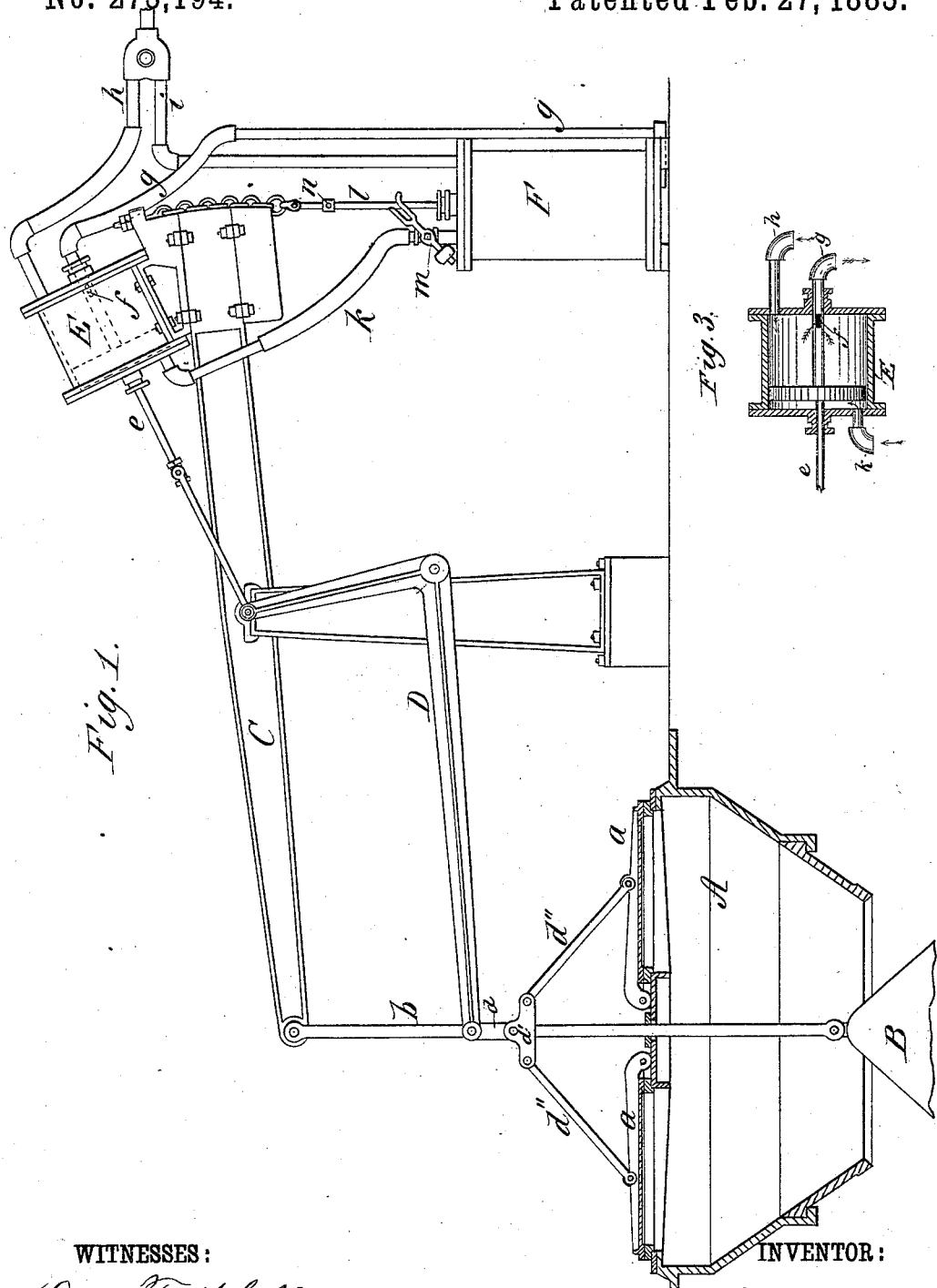
Figure 2:
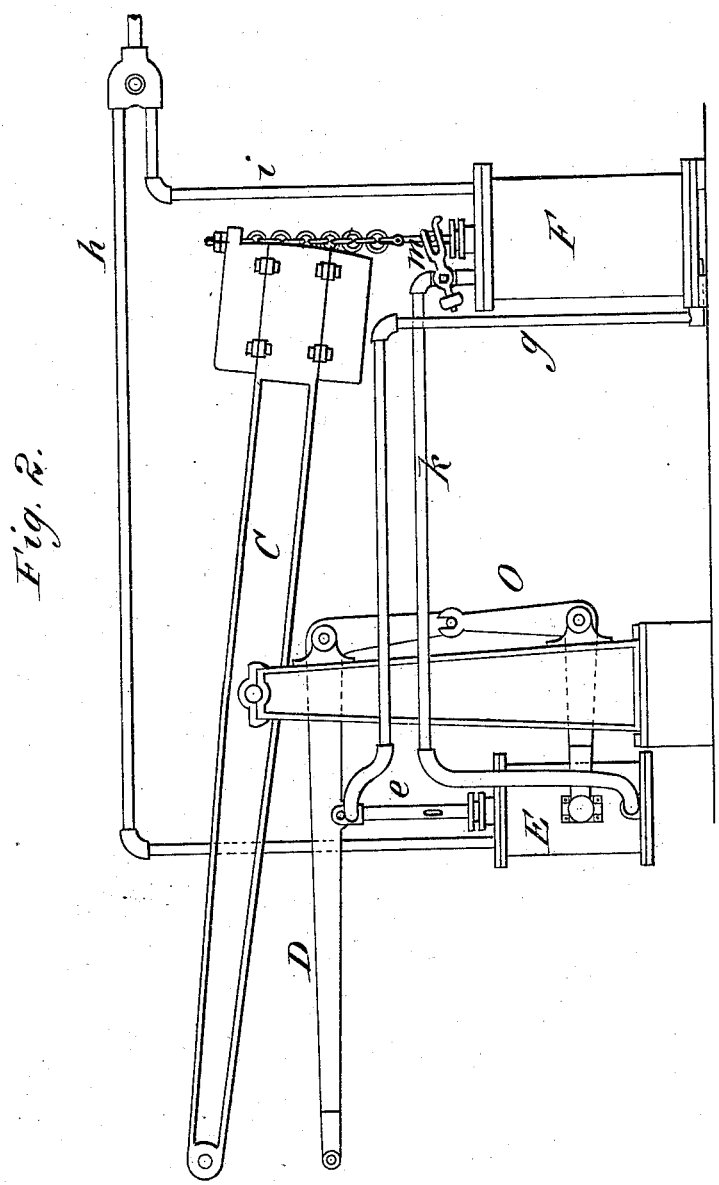

Figure 1 is a sectional elevation of my improved gas-seal, and Fig. 2 is an elevation showing a modified arrangement. Fig. 3 is a detail sectional view of the piston-cylinder E, showing the connection with the steam or air supply tubes and a side aperture in the hollow piston-rod.

A is the hopper, provided with sealing-lids $a\ a$ at its upper side, and a bell, B, for closing its lower end when the lids are opened, as usual.

C is a beam, from one end of which the bell B is suspended by a rod, $b$.

D is a crank-lever, to the outer end of which the lids $a\ a$ are connected by jointed rods $d$.

E is a cylinder supported upon the beam C, and provided with a piston-rod, $e$, that is connected by a jointed link to the crank-lever D. The piston-rod $e$ passes through stuffing-boxes in both ends of the cylinder E, and at its rear end it is hollow and provided with a side opening, $f$.

F is the main cylinder, fixed on a suitable support, and connected to the cylinder E by a tube, $g$, from its lower end to the outer end of the piston $e$, a portion of this tube being flexible to allow the required movement.

$h\ i$ are pipes for supplying steam or compressed air or other fluid, under pressure, to the respective cylinders E F; and K is a pipe directly connecting the two cylinders E F, a portion of this pipe K, as well as the pipe $h$, being flexible.

$l$ is the piston-rod of the cylinder F, connected by a chain to the end of the beam C.

$m$ is a valve in the pipe K, having a forked stem for engaging with the pin $n$ on the piston $l$, so that the valve is thereby opened when the piston $l$ descends. The stem is weighted to hold the valve closed until return of the pin $n$.

The operation is as follows: Steam or compressed air being allowed to enter the cylinder F by the pipe $i$, the piston $l$ moves downward, thereby drawing down the end of the beam C to which the piston is connected, and raising the other end of the beam, so that the bell B is drawn to its seat. At that moment the pin $n$, coming in contact with the stem of the valve $m$, will open the valve and allow escape of the steam or compressed air from the cylinder F through pipe K to the cylinder E, and the piston of the cylinder E is drawn inward, the lever D moved, and the lids $a\ a$ of the seal opened. The hopper may then be charged, after which the air or steam is supplied to the cylinder E by the pipe $h$, the piston $e$ is projected, and the lids $a$ returned to their position. When this occurs the opening $f$ in the hollow piston-rod $e$ will have entered the cylinder E and the steam or air will pass by the pipe $g$ to the lower end of the cylinder F, thereby raising the piston $l$ and lowering the bell B, so that the contents of the hopper will be discharged. It will be seen that the action is both positive and automatic. The seal cannot be neglected nor become displaced, and the operation of the apparatus requires no extra labor more than the ordinary devices.

Fig. 2 illustrates a modified form of my invention. The cylinder E, instead of being placed on the beam C, is pivoted to a forked bell-crank, O, and the latter connects with beam D either by means of a pin and slot, cogs, or other suitable means. The hollow piston-rod $e$ connects directly to beam D. The relation of the air-tubes and the operation are the same as in Fig. 1. In the arrangement shown in Fig. 1 the weight of cylinder E serves to counterbalance the bell. In Fig. 2 it becomes available in operating the seal, and action and reaction being both effectively employed, a much smaller cylinder will do the work.

Cylinder F may be supplied with a hollow piston-rod similar to cylinder E, and the latter provided with a valve. Furthermore, the tube K can be directly connected with tube *i*, and tube *g* with tube *h*, instead of with the opposite cylinder, as shown, provided that the valves are so arranged and connected that they are automatically opened and closed at the proper time.

I am aware that it is not new to operate the bell of a feeding device and gas-seal by a lever vibrated by an engine, or to use hinged lids for covering furnace-hoppers, or to fix the hopper-cover on the bell-rod; but What I do claim as new and of my invention is—

1. The combination, in a feed device and gas-seal, with the mechanism for raising and lowering the lids and bell, of two engine-cylinders, E F, provided with a piston and rod, and connected, as described, by a pipe for the passage of the exhaust-steam from one cylinder to the other, and connected at one end by a steam or air supply, whereby the bell and lids may be operated at different times, but in quick succession, as described.

2. The combination, with the mechanism for raising and lowering the bell and lids of a furnace-hopper, of the cylinder C, having a piston and a rod with pin *n*, the cylinder F, having a piston and a hollow rod with side aperture *f*, the steam-supply pipes *h i*, the pipe *g g*, and the pipe *k*, the latter being provided with a valve forked at one end and weighted at the other, as and for the purpose specified.

3. In a feeding device for furnaces, the combination, with the hopper-lids *a* and the bell and rod for supporting the same, of the jointed rods *d″*, the cross-head *d′*, the sleeve *d*, the elbow-lever D, pivoted at its elbow, the lever C, and suitable means for actuating said levers, as and for the purpose specified.

EDWARD A. UEHLING.

Witnesses:
JONATHAN J. HOFINS,
JOHN McCLURE.